Figure 2:
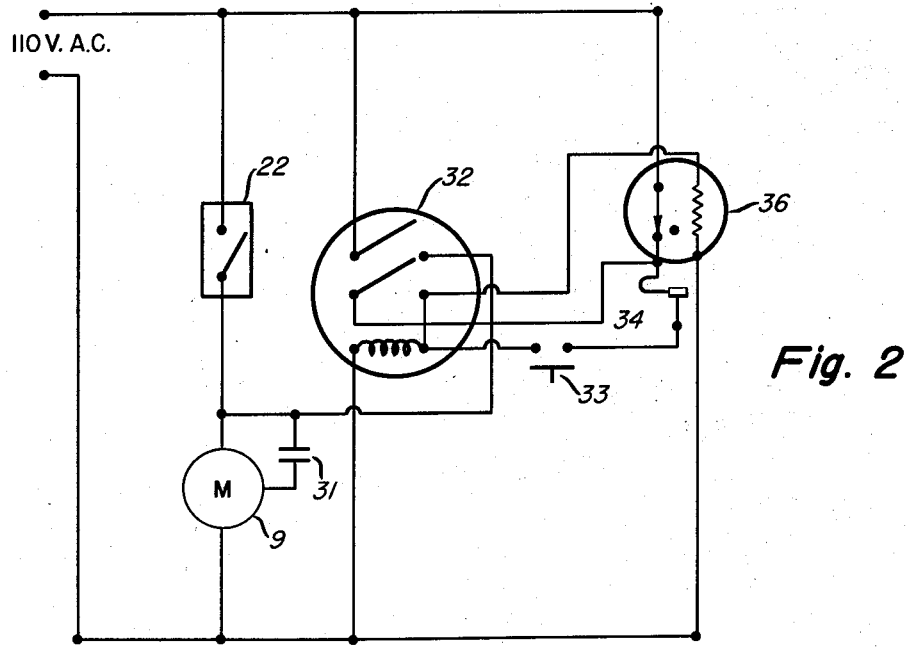

Dec. 31, 1963   J. C. RHODES ETAL   3,115,768
VISCOSIMETER APPARATUS
Filed Oct. 26, 1959

INVENTORS:
Joseph C. Rhodes
John P. Segers
BY
ATTORNEY

United States Patent Office 3,115,768
Patented Dec. 31, 1963

3,115,768
VISCOSIMETER APPARATUS
Joseph C. Rhodes, Park Forest, and John P. Segers, Crete, Ill., assignors to Standard Oil Company, Chicago, Ill., a corporation of Indiana
Filed Oct. 26, 1959, Ser. No. 848,854
8 Claims. (Cl. 73—55)

This invention relates to apparatus for determining the viscosities of fluids. More particularly, it concerns a simplified viscosimeter having improved accuracy. In one aspect, the invention provides a batch viscosimeter having integral compensation for variations in sample temperature. In another aspect, it provides an automatic viscosimeter for testing liquids such as lubricating oils.

The absolute viscosity of liquids, expressed in poises or centipoises, is a characteristic of much importance in many manufacturing process control and product quality control applications. Lubricant oils, for example, are almost invariably made and blended to absolute viscosity specifications. Because such viscosity is often so important in the final lubricating oil product, it is essential to have available an accurate, rapid apparatus for determining the absolute viscosity. At the same time, however, the apparatus must be rugged, low in cost, and simple to construct and operate. Also, when viscosimeters are to operate batchwise as in a quality control laboratory, they must be able to accommodate samples which initially have widely varying temperatures. Viscosimeters simultaneously possessing all of these characteristics have long been desired.

A primary object of the present invention is to provide a simple, rugged viscosimeter which is capable of being used with liquid samples of uncontrolled initial temperature. Another object is to provide a batch viscosimeter for laboratory or plant use which is extremely rapid in furnishing a viscosity reading. A further object is to provide a fully automatic batch viscosimeter. Still another object is to provide an electrical circuit for effecting such automatic operation. Other and more particular objects will be apparent as the description of the invention proceeds.

Basically, the present invention is an improvement involving the type of viscosimeter having a substantially constant volume pump, a viscosity-measuring capillary tube downstream of the pump, a gauge which is sensitive to the pressure differential across the tube and hence measures the viscosity of fluids being pumped through the tube, and a constant temperature bath in which the pump and tube are immersed.

By the term "substantially constant volume pump," we mean a pump which continuously delivers fluid at a very nearly—but not exactly—constant volumetric flow irrespective of downstream pressure. Such pumps are frequently termed "positive displacement pumps," and include gear pumps, peristaltic pumps, and the like. These "substantially constant volume pumps" do invariably have a small but significant mechanical clearance between the parts thereof, so that an increase in back pressure causes a small amount of the liquid to "slip" back through the pump.

In accordance with one aspect of the invention, we compensate for changes or variations in the initial temperature of the sample fluid in the pump by disposing a second, or temperature compensating, capillary tube intermediate the pump and the first capillary tube. This second capillary tube increases the back pressure, and hence the slippage, of the pump when fluid in the pump is initially at a temperature lower than the bath temperature. Without such second capillary tube, thermal expansion of cold fluid as it flows between the pump and the first, or viscosity-measuring, capillary tube would increase the volumetric rate of flow through the latter and create a major error in viscosity reading. However, by use of a second capillary tube between the pump and the viscosity measuring capillary tube, pump back pressure and pump slippage are increased slightly (and hence flowrate is decreased slightly) when a cold, more viscous fluid is pumped into the temperature compensating capillary tube.

According to another aspect of the invention, we provide an automatic switch system for a batch viscosimeter or like device which permits fully automatic operation of the viscosimeter. To accomplish this, we connect a manually activated relay in the electrical power circuit for operating the pump, connect a pressure responsive switch downstream of the pump, and employ a time delay switch to connect the pressure responsive switch in the power circuit after a predetermined time interval. Thus, both initially and until the time delay switch functions, the pump operates independent of downstream pressure (i.e., at least until the lines fill up with fluid), but once the time delay switch goes into operation, the continued operation of the pump is contingent on maintaining pressure downstream of the pump. When such pressure terminates, this indicates loss of suction to the pump, and hence depletion of the sample and the end of a test. The combination of a temperature-compensating capillary, together with the instant automatic electrical switching system, permits full advanage to be taken of both of these elements in providing a batch viscosimeter for laboratory or plant quality control use.

Figure 1:
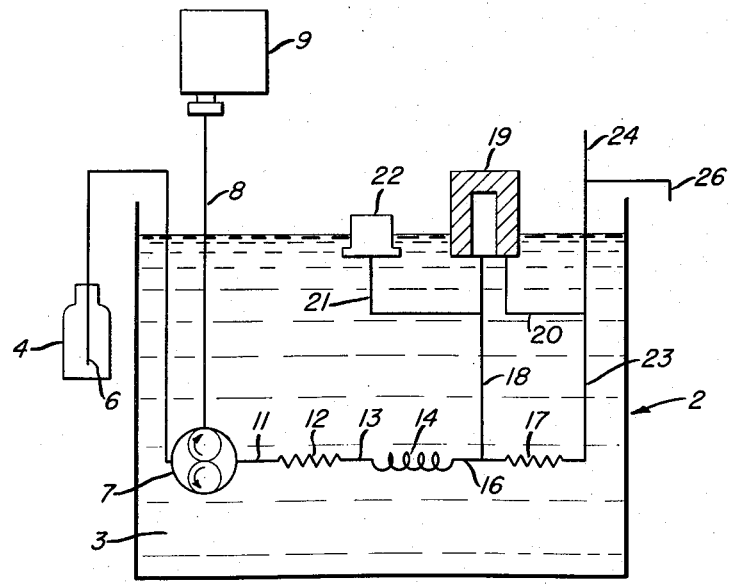

Further details and advantages of the invention will become apparent in the ensuing description when read in conjunction with the attached drawings wherein:

FIGURE 1 is a schematic elevation of a batch viscosimeter including the second, or temperature-compensating, capillary tube 12; and FIGURE 2 is an electrical schematic diagram showing the switch gear employed in making a batch viscosimeter fully automatic.

Referring first to FIGURE 1, sample fluid is initially placed within sample fluid reservoir 4, from which suction is taken via sample intake line 6 by means of pump 7.

Pump 7, together with temperature-compensating capillary tube 12, heat exchanger 14, and viscosity measuring capillary 17 are immersed within a constant temperature bath 2. Bath 2 is filled with fluid 3, such as water or a high boiling hydrocarbon or silicone oil and is maintained at constant temperature by means of an electrical heater and an associated thermoregulator, not shown. Since such heaters and thermoregulators are well known in the art, and a wide variety of suitable devices are available, these features will not be discussed further. For viscosity measurements, it is essential for high accuracy that the temperature of bath 2 be maintained at an accurately controlled constant temperature; for lubricant oil viscosity measurements, viscosities are determined at temperature of 100° F. and 200° F., and it is usual to control each of these temperatures to within about 0.2° F. by a suitable thermoregulator.

Pump 7 is a substantially constant volume pump, preferably of the gear type which positively displaces fluid at a continuously and constant flowrate, which is very nearly independent of downstream pressure. For automotive lubricant oil testing, it has been found that a gear pump 7 having a capacity of 40 cc. per minute, when used in combination with capillaries and heaters of dimensions to be presented in a subsequent portion of this description, is of satisfactory size. Pump 7 should be as carefully made and as well maintained as possible in order to reduce the amount of slippage to a very small, almost negligible, amount.

Downstream of pump 7 is a temperature-compensating capillary tube 12, which is connected to pump 7 via conduit 11. This temperature-compensating capillary tube 12 is to compensate for temperature variations of sample in sample reservoir 4 and pump 7, and does so by increasing the pump slippage of cold fluids. Cold fluids have a higher viscosity than warm fluids, and thus a higher pressure is required to force them through temperature-compensating capillary tube 12 at a constant flowrate. Without the use of temperature-compensating capillary 12, fluid discharged from pump 7, if colder than bath 2, would expand by reasons of its thermo-coefficient of expansion, and actually increase the volumetric rate of flow through viscosity measuring capillary 17. This would have the effect of introducing two variables in the Poiseuille equation, to be discussed momentarily, and hence would render apparent viscosity measurements exceedingly inaccurate.

However, because of temperature-compensating capillary 12, a cold oil increases the downstream pressure on pump 7 and increases the slippage through the pump. Hence, volumetric flowrate through pump 7 is slightly decreased when a cold fluid is being pumped, and this decrease in flowrate compensates, as nearly as possible, for the effect on volume increase caused by thermal expansion of the cold fluid. Although the dimensions of temperature-compensating capillary 12 are best determined by trial and error to match a particular substantially constant volume pump 7, it has been found that, using the highest quality gear pumps, a 40 cc. per minute pump discharge rate can be afforded temperature compensation of its contained fluids by using a capillary 12 which is 6″ long and having an inside diameter of 0.031″.

Downstream of temperature-compensating capillary 12 and located intermediate of temperature-compensating capillary 12 and viscosity measuring capillary 17 there may be disposed a heat exchanger 14 consisting of coils of relatively small diameter metal tubing. This heat exchanger permits the temperature of fluid discharged from pump 7 to reach temperature equilibrium with the liquid 3 in constant temperature bath 2, which is essential for accurate viscosity measurements. Heat exchanger 14 is connected to temperature-compensating capillary 12 via conduit 13 and to viscosity measuring capillary 17 via conduit 16.

The viscosity measuring capillary 17 may comprise a coiled capillary tube 5 feet 8 inches in length, having an inner diameter of 0.062″ and an outer diameter of ⅛″. The pressure drop across the inlet and outlet of capillary 17 is directly proportional to the absolute viscosity of fluid being pumped through capillary 17, according to the Poiseuille equation, $$\eta = p\frac{\pi r^4}{8lv}$$

where $\eta$ is viscosity (in absolute units), $r$ is the radius of the tube through which the liquid flows, $l$ is the length of the tube, $v$ is the volume of liquid per unit time, and $p$ is the pressure drop across the tube. All values are kept constant except $\eta$, which will then be a linear function of the pressure drop $p$ across the restrictive capillary 17. This drop is directly proportional to absolute viscosity of the liquid.

The differential pressure across viscosity measuring capillary 17 is sensed by a suitable gauge, of which the drawing shows a preferred type. In the preferred embodiment, the gauge comprises an electrical strain gauge 19 connected via conduit 18 near the inlet of viscosity measuring capillary 17. Strain gauge 19 is also optionally connected at the outlet of viscosity measuring capillary 17, as for example via line 20 to outlet conduit 23. The outlet of this capillary 17 vents to atmosphere via outlet conduit 23 and an open topped T 24, permitting the discharged sample to drain via conduit 26 and exhaust to atmospheric pressure. Hence measurement of upstream pressure by means of strain gauge 19 affords measurement of the pressure drop across the measuring capillary 17.

Strain gauge 19 is the preferred type of pressure sensing device inasmuch as there is virtually no change in the volume of fluid in gauge 19 with increasing pressure, in contrast to Bourdon tube gauges, which however may also be employed in less expensive embodiments. Strain gauge 19 connects to a suitable electrometer measuring circuit, of which many types are known, to provide a pressure reading which may be converted, by suitable dial calibrations, to a direct reading of absolute viscosity in poises, SSU seconds, or the like.

Other features which are shown in FIGURE 1 include a synchronous electrical motor 9 which is connected to pump 7 via shaft 8, and a pressure sensitive electrical switch 22 which is connected via conduit 21 near the inlet to viscosity measuring capillary 17. The purpose and function of pressure switch 22 will be explained in connection with the gear tube.

Turning now to FIGURE 2, an electrical circuit is portrayed which permits the viscosimeter to perform a viscosity measurement entirely automatically, without supervision other than filling a sample reservoir, pressing a switch, and taking a reading.

Electrical current is supplied to the system to power the pump via sample pump motor 9. Capacitor 31 is connected to motor 9, which is of the capacitor type. Motor 9 is synchronized to the frequency of the electrical power, and is for example an 180 r.p.m. synchronous motor.

Pressure switch 22 (which is connected upstream of viscosity measuring capillary 17 in FIGURE 1) and a time delay relay 36 are each connected in parallel with respect to each other and in series with motor 9. If either switch is in its closed position, the power is supplied to drive motor 9 and hence the substantially constant volume pump (pump 7 in FIGURE 1). The circuit also includes a self-locking delay switch 32, which is of the double pole single throw type, where the poles are held in normally open position unless electromagnet in switch 32 is energized, after which the poles are held against a spring bias in the closed position so long as current is passing through the electromagnet. Relay switch 32 is energized by means of manually activated push button switch 33, which completes the circuit through relay 32 and motor 9. In addition, an optional switch 34 may be provided to interrupt the power circuit should the temperature of the bath (bath 2 in FIGURE 1) drop below a predetermined level. Switch 34 may comprise a conventional bimetallic switch.

The time delay relay 36 is also included in the circuit. Relay 36 is in the normally closed position, but after a predetermined time interval, say two minutes after switch 33 is pressed, will open the circuit.

The automatic circuit operates as follows. When switch 33 is manually pressed, current flows through time delay relay 36, closes the circuits of self-locking relay 32, and permits current to flow through motor 9, thereby starting the substantially constant volume pump. Initially, pressure switch 22 is in the open position, since no pressure is initially available at the discharge of the pump 7, at least until the pump and its discharge lines all fill with sample fluid. The pump continues in operation until time delay relay 36 cuts out. When this occurs, there will ordinarily be sufficient pressure develop at the discharge of the pump to maintain pressure switch 22 in the closed position, thereby providing power to motor 9 via the alternate line including the pressure switch 22. Thus, even though time delay relay 36 is open and hence self-locking relay 32 is also open, the pump motor 9 is maintained in operation by virtue of the closing of pressure switch 22. During this period a measurement is made of the pressure differential across the viscosity measuring capillary tube as a measure of sample viscosity.

However, once the sample is exhausted and no fluid is available at the suction of the pump 7 (in FIGURE 1), the pump can no longer discharge fluid at a positive pressure. This immediately opens pressure switch 22 and shuts off pump motor 9, thereby completing the test and shutting down the viscosimeter apparatus for a further test on a new sample.

Although we have described the invention in terms of examples which are set forth in some detail, it should be understood that these are by way of illustration only and that our invention is not limited thereto. Accordingly, alternative embodiments will become apparent to those skilled in the art in view of our description of this embodiment, and it is intended to embrace all such modifications as fall within the spirit and broad scope of the invention.

We claim:

1. In a viscosimeter apparatus including a constant temperature bath, a substantially constant volume pump immersed in said bath, a first capillary tube also immersed in said bath through which said substantially constant volume pump discharges, and a gauge sensitive to the pressure differential across said first capillary tube as a measure of fluid viscosity, the improvement comprising a second capillary tube of the temperature compensating type immersed in said constant temperature bath and connected intermediate said substantially constant volume pump and said first capillary tube whereby a change in temperature of fluid in said pump varies the back pressure against said pump and thereby changes the pumping rate to compensate for said change in temperature.

2. Viscosimeter of claim 1 wherein said first capillary tube discharges to atmosphere and the gauge sensitive to the pressure differential across said first capillary tube is a strain gauge connected upstream of said first capillary tube.

3. Viscosimeter of claim 1 including a heat exchanger intermediate said first and said second capillary tubes.

4. A viscosimeter apparatus comprising a constant temperature bath, pump means immersed in said bath for pumping fluid at substantially constant volumetric flow-rate, a first flow restrictive tube means immersed in said bath and connected downstream of said pump means, means for sensing the pressure differential across said first flow restrictive tube means as a measure of fluid viscosity, and a second flow restrictive tube means of the temperature compensating type connected intermediate said pump means and said first flow restrictive tube means to vary pump slippage according to pump fluid temperature and thereby compensate for variations between pump fluid temperature and the temperature of fluid in said first flow restrictive tube means.

5. A batch viscosimeter comprising a sample fluid reservoir, a constant temperature bath, a first capillary tube immersed in said bath, a substantially constant volume pump immersed in said bath and connected to said pump sample fluid from said sample fluid reservoir to said first capillary tube, means for sensing pressure differential across said first capillary tube as a measure of fluid viscosity, a second capillary tube of the temperature compensating type connected intermediate said constant volume pump and said first capillary tube, and a heat exchanger means connected intermediate said second capillary tube and said first capillary tube.

6. An automatic batch viscosimeter apparatus comprising a sample fluid reservoir, a constant temperature bath, a substantially constant volume pump withdrawing sample fluid from said sample fluid reservoir, a temperature compensating capillary tube serially connected downstream of said substantially constant volume pump, a constant temperature bath within which are immersed said pump and said tubes, means for sensing pressure differential across said measuring capillary tube as a measure of fluid viscosity, switch means responsive to pressure at the inlet to said measuring capillary tube, manually activated relay means in a power circuit operating said substantially constant volume pump, and time delay switch means for connecting said pressure responsive switch means in said power circuit after a predetermined time interval and thereby make continued operation of said pump contingent on maintenance of pressure at the inlet to said measuring capillary tube.

7. Apparatus of claim 6 wherein said measuring capillary tube discharges to atmosphere and the means for sensing pressure differential across said measuring capillary tube is a pressure gauge connected near the inlet to said measuring capillary tube.

8. A system for operating a pump and automatically terminating the operation of such pump after a predetermined time upon loss of suction to said pump, which system comprises manually activated relay means in a power circuit operating said pump, switch means responsive to pressure downstream of said pump, and time delay switch means for connecting said pressure responsive switch means in said power circuit after a predetermined time interval and thereby make continued operation of said pump contingent on the maintenance of the pressure downstream of said pump, and hence contingent on the maintenance of suction to said pump.

References Cited in the file of this patent

UNITED STATES PATENTS

| | | |
|---|---|---|
| 2,322,814 | Binckley | June 29, 1943 |
| 2,400,910 | Booth | May 28, 1946 |
| 2,550,093 | Smith | Apr. 24, 1951 |
| 2,791,902 | Jones | May 14, 1957 |
| 2,834,200 | Rhodes et al. | May 13, 1958 |
| 2,882,827 | Conto | Apr. 21, 1959 |